Figure 23:
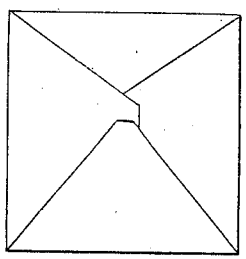

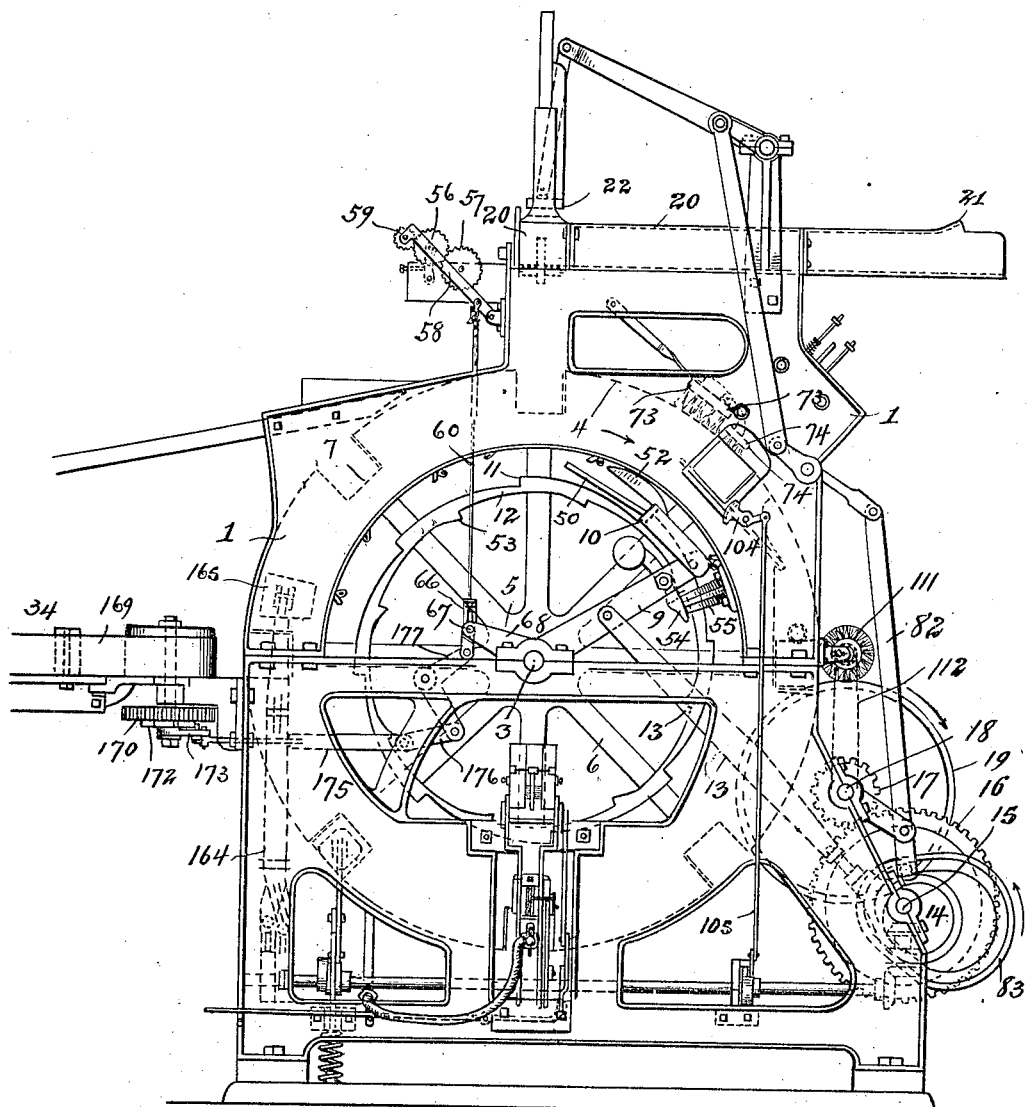

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 2.
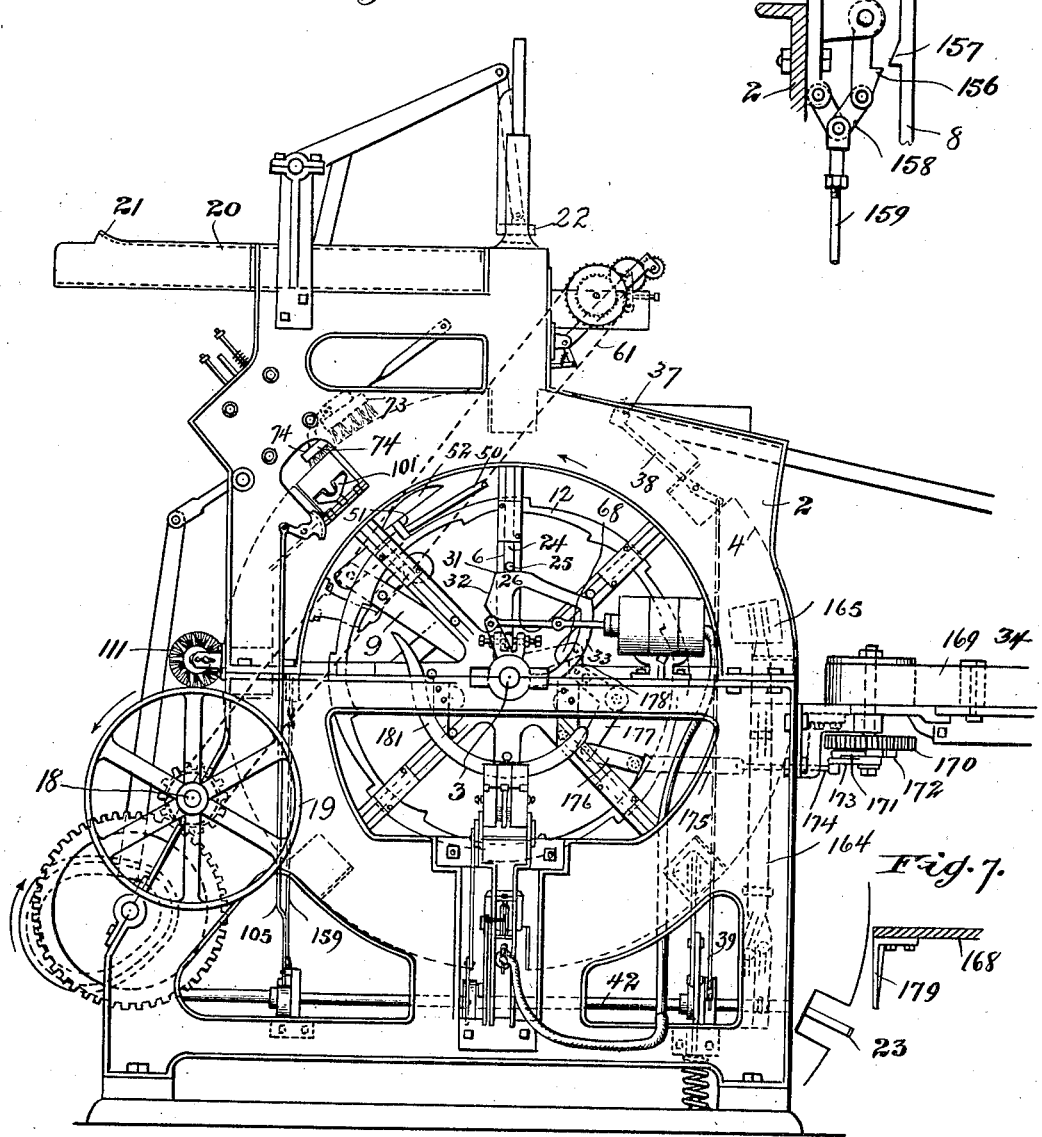
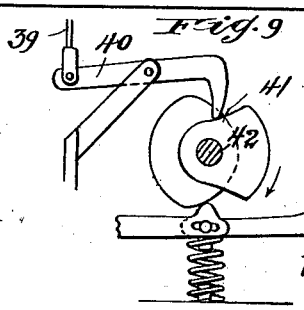

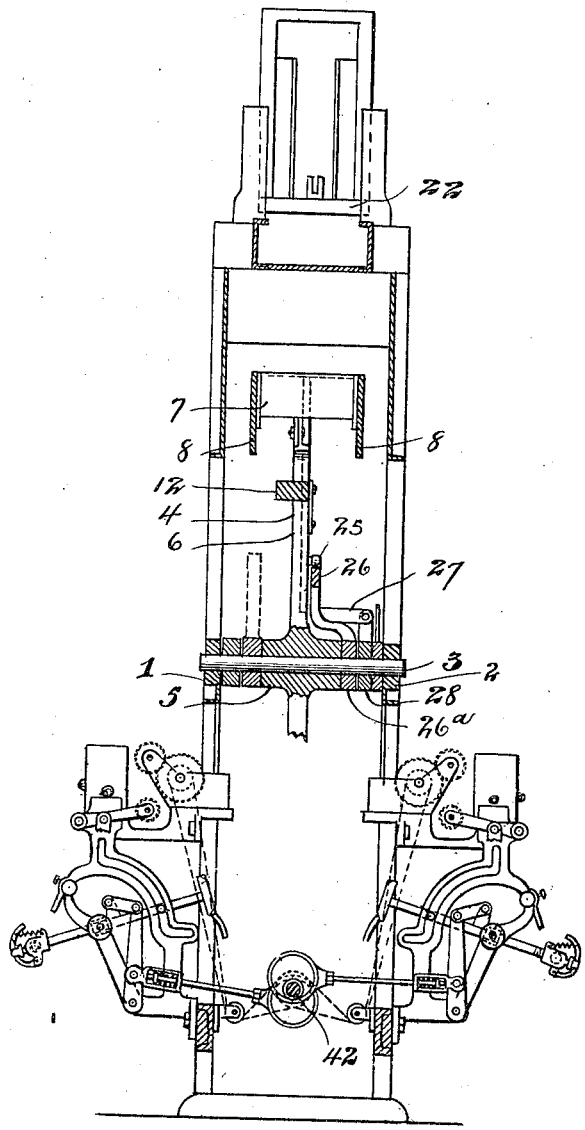

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 4.
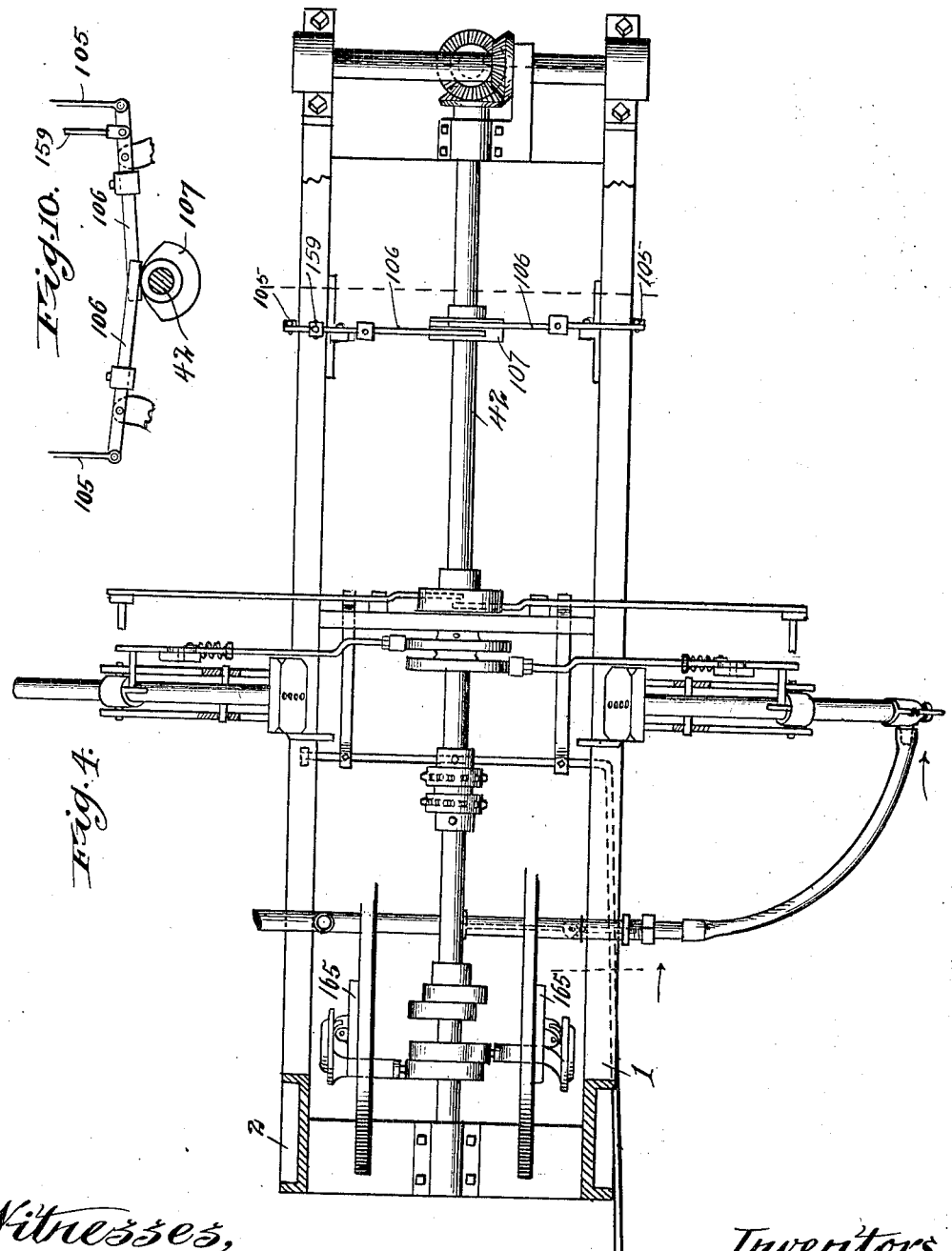

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 5.
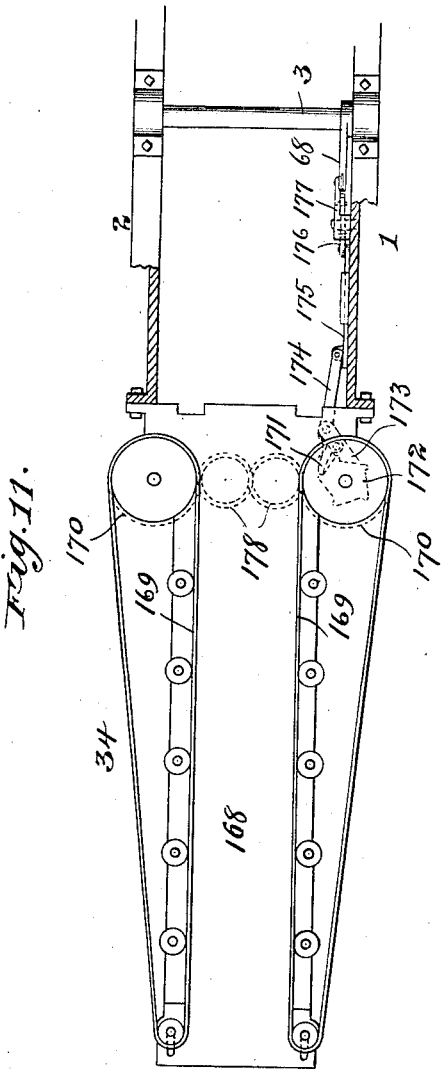

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 6.
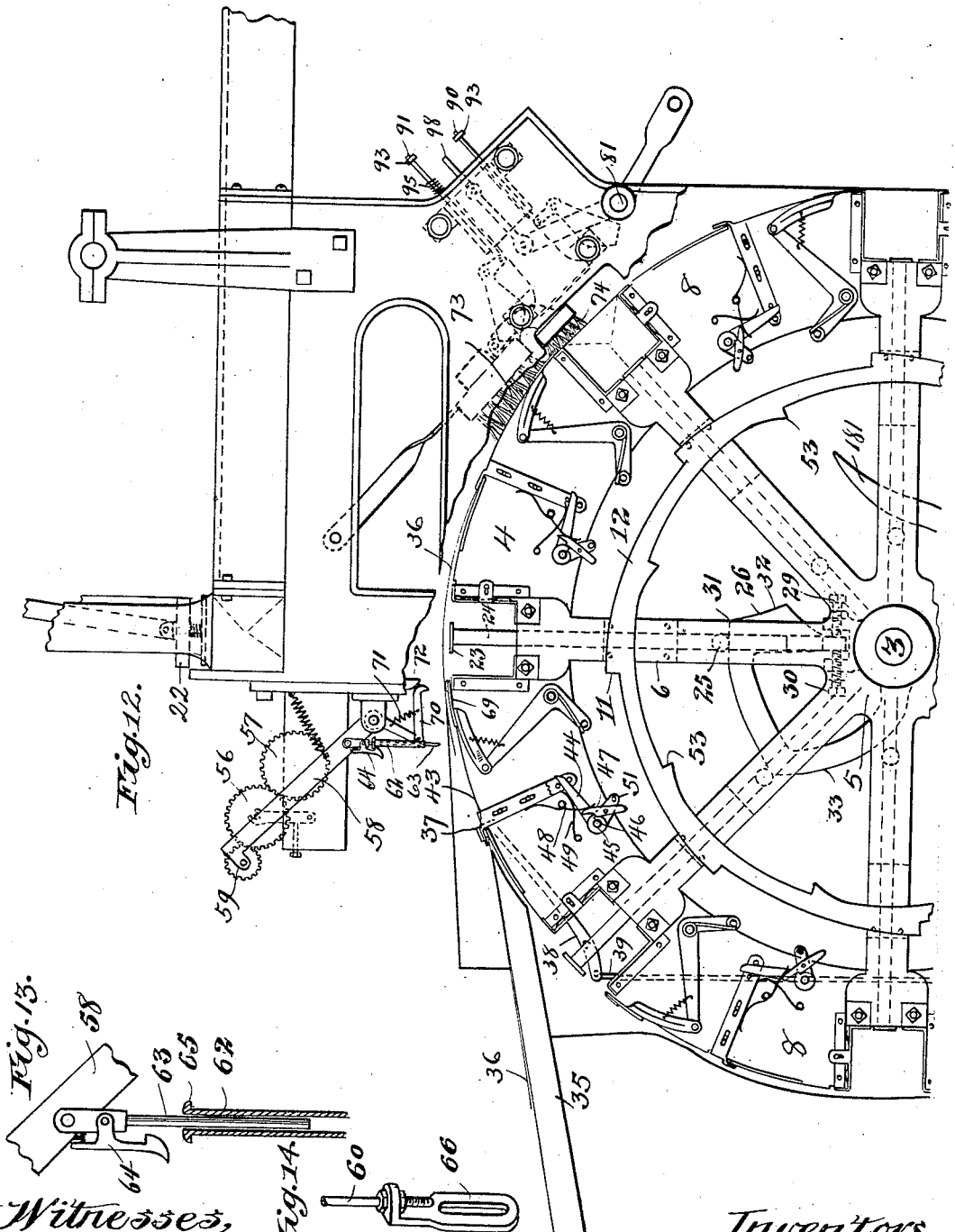

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 7.
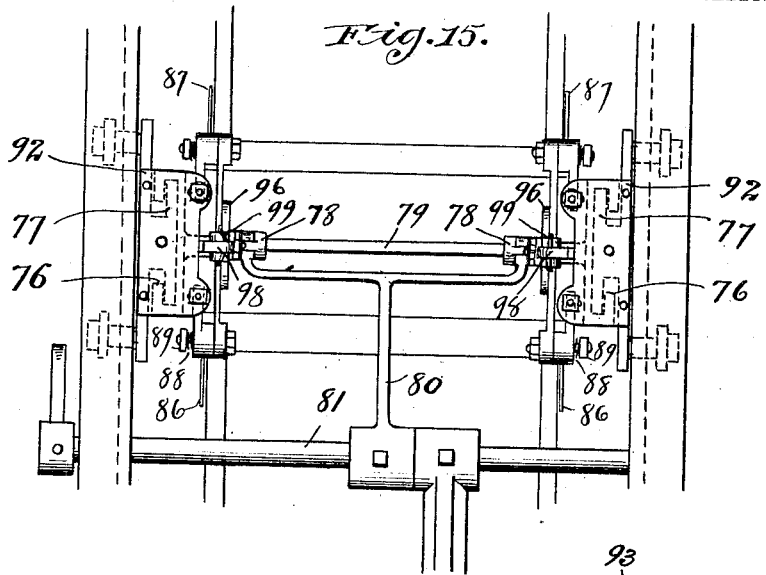
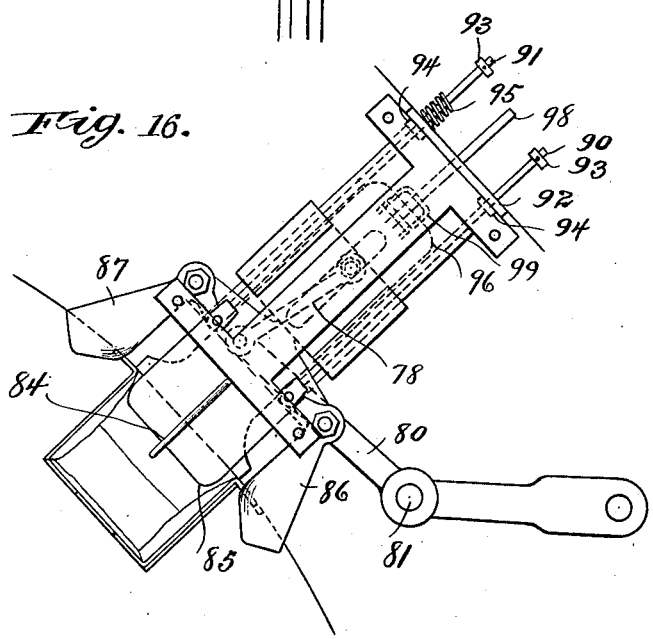

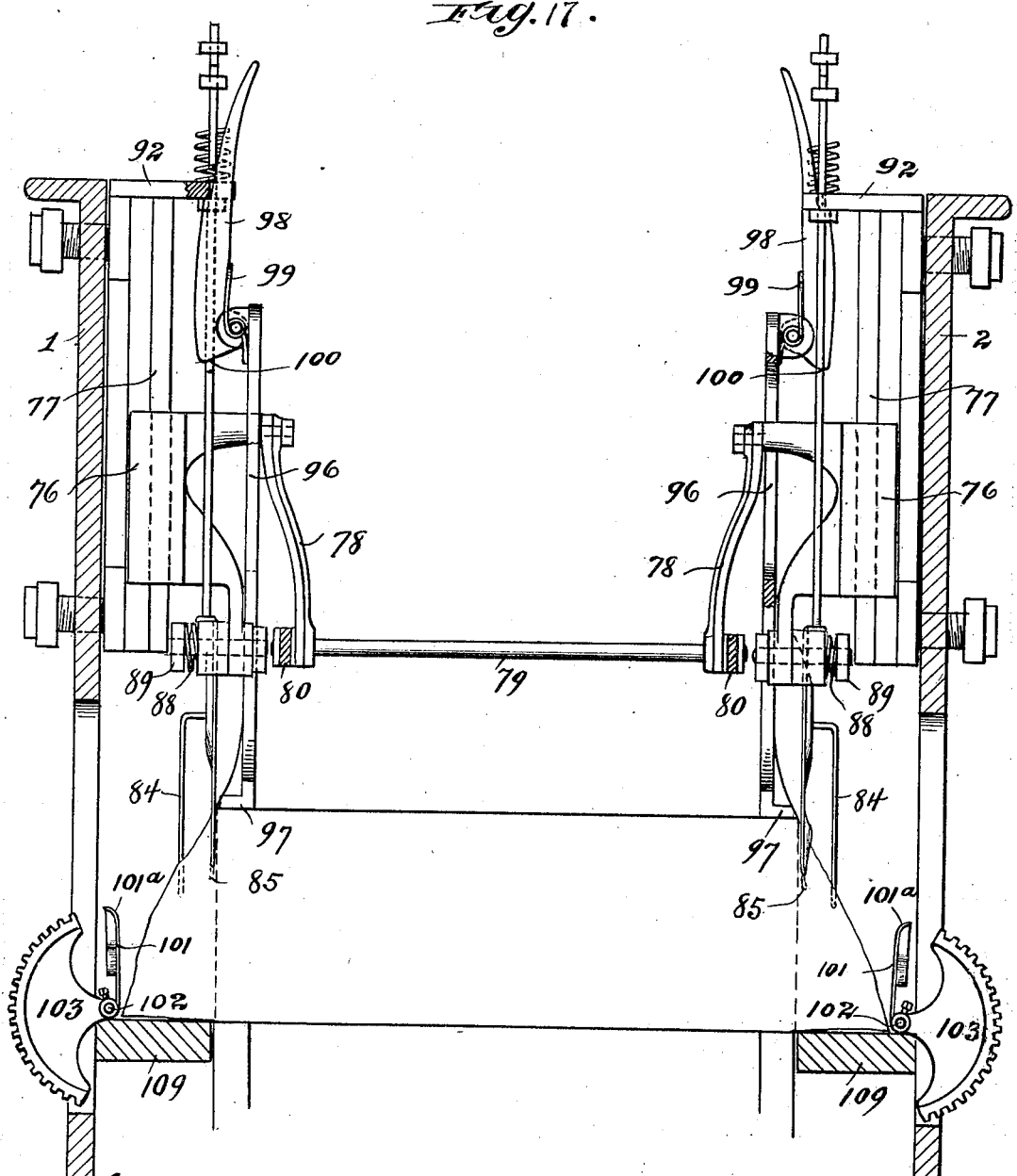

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.

11 SHEETS—SHEET 9.

Witnesses,
F. S. Mann
S. N. Pond.

Inventors,
Frank M. Peters,
Henry H. Hungerford
By Offield, Towle & Linthicum
Attys.

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 10.
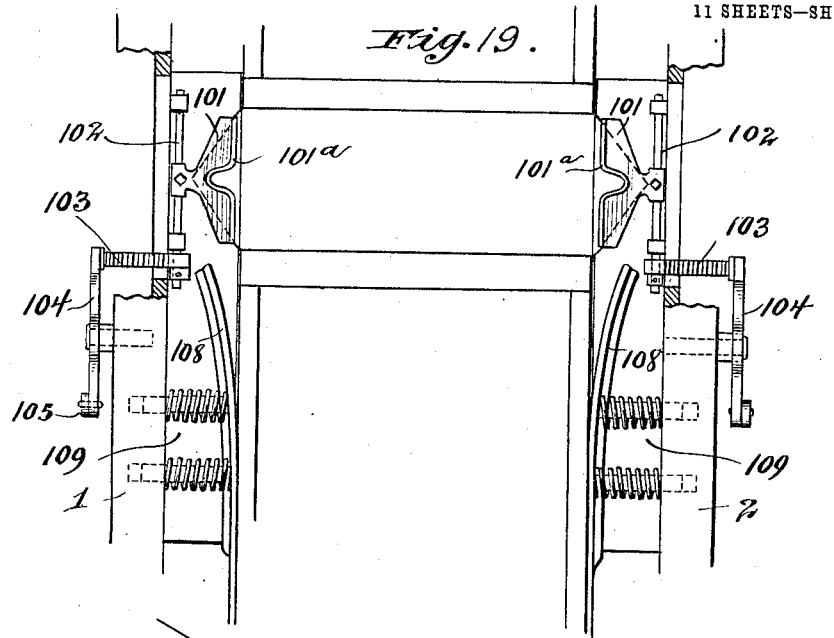
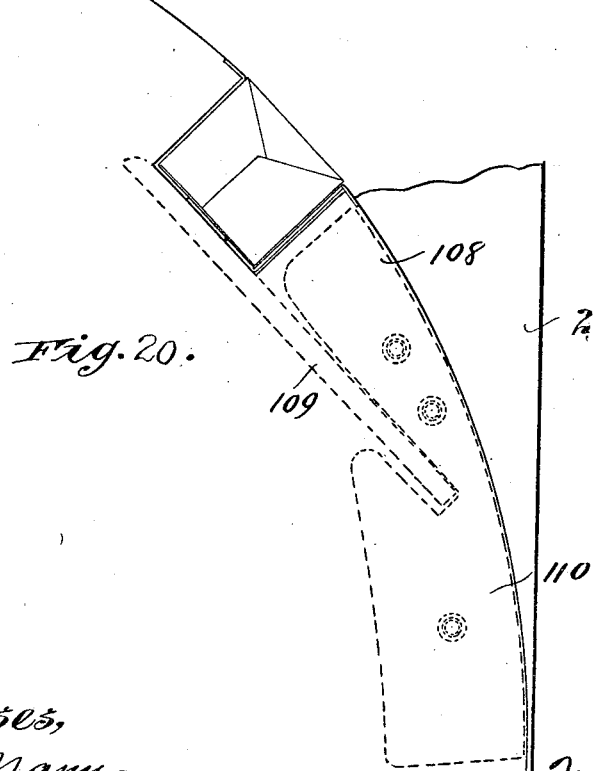

No. 838,269. PATENTED DEC. 11, 1906.
F. M. PETERS & H. H. HUNGERFORD.
MACHINE FOR WRAPPING PACKAGES.
APPLICATION FILED SEPT. 11, 1901.
11 SHEETS—SHEET 11.
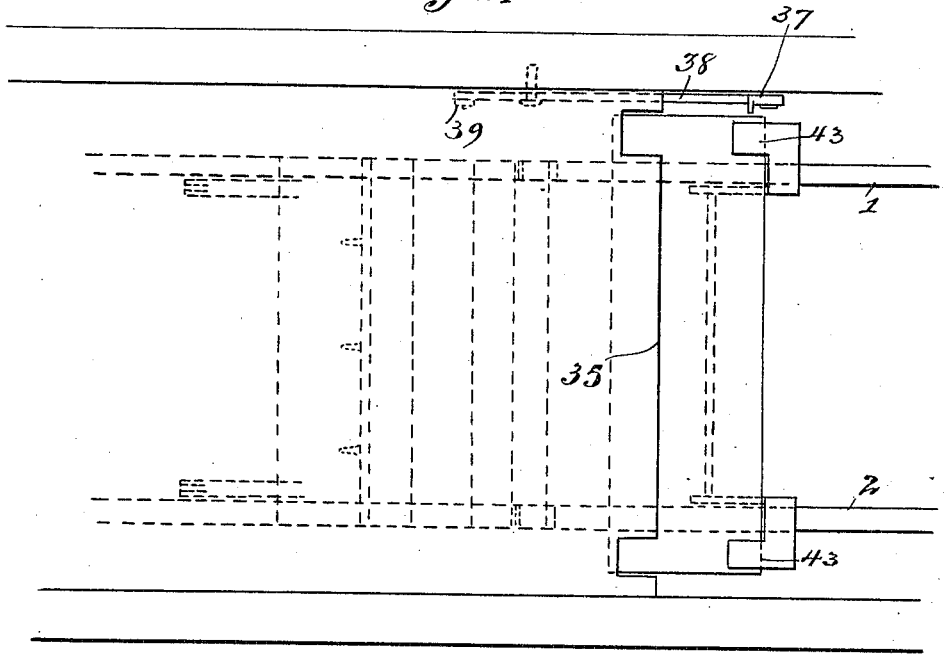
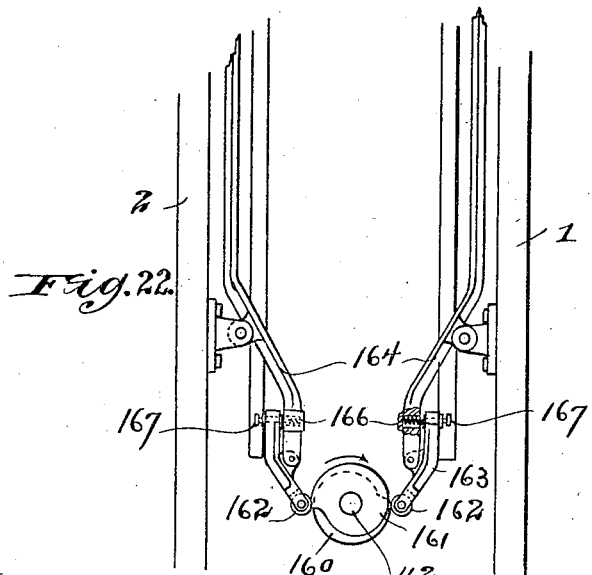
Witnesses,
Inventors,
Frank M. Peters,
Henry H. Hungerford
By Offield, Towle & Linthicum
Att'ys.

UNITED STATES PATENT OFFICE.

FRANK M. PETERS AND HENRY H. HUNGERFORD, OF CHICAGO, ILLINOIS; SAID HUNGERFORD ASSIGNOR TO SAID PETERS.

MACHINE FOR WRAPPING PACKAGES.

No. 838,269.  Specification of Letters Patent.  Patented Dec. 11, 1906.

Application filed September 11, 1901. Serial No. 75,100.

*To all whom it may concern:*

Be it known that we, FRANK M. PETERS and HENRY H. HUNGERFORD, of Chicago, Illinois, have invented certain new and useful Improvements in Machines for Wrapping Packages, of which the following is a specification.

This invention relates to certain improvements in that class of machines which are intended to apply a wrapper to a package and which are provided with means for folding the wrapper and securing the folds by means of labels or other adhesive seals applied to such folds. The machine is specially adapted to apply the outer wrapper to packages which are already inclosed in pasteboard boxes or cartons.

Our present invention comprises certain improvements upon the machine which is fully described in our former patent, No. 672,286, granted April 16, 1901; and our invention more particularly relates to certain improvements in a guide trough or chute for feeding the package to the wrapping-machine, to a guide and positioner for the wrapper sheet or blank, to means for forming the folds or flaps and for setting the folds, to a means for controlling the revolving carrier, whereby it is operatively locked at the end of each actuation, to certain improvements in ejectors for discharging the package from the carrier after it is wrapped, and to certain improvements in the mechanical structure and combination of devices, which will be hereinafter described, and more fully pointed out in the claims.

Figure 24:
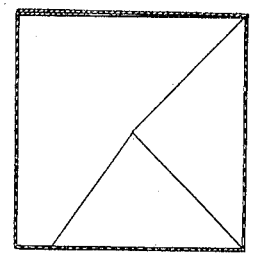
Figure 18:
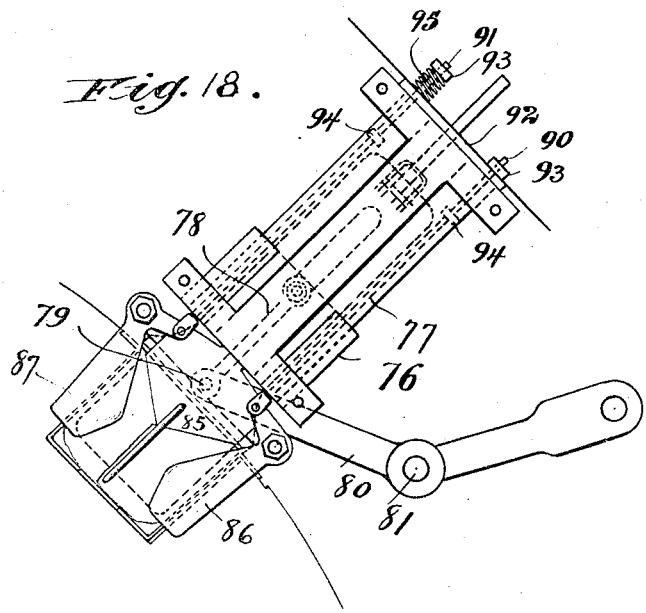

In the accompanying drawings, Figure 1 is a side elevation of the machine embodying our invention in its present improved form. Fig. 2 is a similar view showing the opposite side of the machine. Fig. 3 is a transverse sectional elevation through the framework and carrier of the machine. Fig. 4 is a sectional plan view showing the driving-shaft and a cam-shaft from which the operative parts of the machine are driven. Figs. 5 to 10, inclusive, are detail views of parts shown in the general views of the preceding figures. Fig. 11 is a plan view of an off-bearing or package-delivering device, showing its relation to the delivery side of the wrapping-machine. Fig. 12 is an enlarged side elevation of the upper portion of the wrapping-machine with parts broken away and others omitted, and particularly intended to show the relation of the wrapper feed-guide, &c. Figs. 13 and 14 are details of parts shown in Fig. 12. Fig. 15 is a plan view of a portion of the folding mechanism. Fig. 16 is a side elevation of the same. Fig. 17 is an elevation of the parts shown in Fig. 16 looking in the direction of the arrow, parts being broken away and others omitted. Fig. 18 is a view similar to Fig. 16, but showing the position of the parts after the operative movement of the folding mechanism in one direction is completed. Fig. 19 is a plan section of the mechanism for guiding and folding the last flaps of the ends of the wrapper. Fig. 20 is a side elevation showing the side end flaps of the wrapper folded. Fig. 21 is a partial plan view of the carrier, showing a pair of grippers and a guide and gage for positioning the wrapper. Fig. 22 is an elevation of certain brake-actuating mechanism, the upper ends of the brake-levers being broken away; and Figs. 23 and 24 are views of the ends of the carton or package, Fig. 23 being an end view of the wrapped package before the application of a label, and Fig. 24 an end elevation of the carton or package, the wrapper being shown in section.

In the construction of the machine shown in the drawings we have followed the general plan of the machine shown in our patent before referred to and will not in the present description enter upon the details of the several parts, except as they have been modified by our present improvements.

Referring to the drawings, 1 and 2 indicate the opposite sides of the stationary main frame, in which is mounted the oscillating shaft 3, supporting the rotary carrier 4, which is composed of the central hub 5, the spokes or webs 6, and the peripheral receptacles 7, which are connected circumferentially by the side plates 8. An intermittent rotary motion is imparted to the carrier by means of the vibrating arm 9, which engages by means of a pawl 10 the teeth 11 in a ratchet-ring 12, secured to the spokes of the carrier. The vibrating movement is imparted to the arm by means of the connecting-rod or pitman 13, whose lower end engages the eccentric 14 on the counter-shaft 15. The counter-shaft is driven through the gears 16 17 from the main shaft 18, to which power is applied through the pulley 19.

The packages are fed to the machine through the trough or chute 20, which is adapted to receive the packages to be wrapped and along which they may be fed by hand or in any suitable manner. The chute is preferably of a width equal to the length of the packages, and its outer or receiving end is preferably upwardly flared, as shown at 21. The purpose of this feature is to engage and automatically close any package whose cover may be partly raised or open. In the plane of the vertical axis of the carrier is located a plunger 22, by which the packages are forced into the peripheral receptacles of the carrier as they are successively presented in line therewith. The carrier is provided with certain pistons on which the packages delivered by the plunger are received, and these pistons and their operating devices are best shown in Fig. 12 and are marked 23. The piston-stems 24 slide longitudinally in suitable ways along the radial spokes 6 of the carrier and toward their inner ends are provided with antifriction-rollers 25, which are engaged by a cam-plate 26. The cam-plate 26 is shown in side elevation in Figs. 2 and 12 and in section in Fig. 3. Said cam-plate has a hub 26ᵃ, which is slipped over the oscillating shaft 3 and is provided with an outstanding arm 27, carried by a hub 28, fixed on the shaft. The cam-plate thus partakes of the oscillations of shaft 3, and the arm 27 is positioned laterally by the set-screws 29 30, and thereby the cam-plate may be very accurately adjusted so as to secure the properly-timed movement of the piston-rods and pistons. The cam-plate is so disposed that the piston lies in the plane of the opening of the receptacle before a package has moved down toward the carrier, and at this moment a wrapper is in position over the receptacle and covering the upper surface of the piston, as shown in Fig. 12. As the package is deposited upon the wrapper lying over the piston the arm 9 is rocked to carry its dog back into position to engage a new tooth. Since the cam-plate 26 is secured with the shaft 3, which carried the arm 9, it is evident that the cam-plate will also be rocked backward with said arm and that during said movement the pin 25, connected with the arm of the piston which is then sustaining the package, will pass over the point of the cam marked 31, and as the plunger and package descend the pin 25 will ride down the inclined cam-surface 32, thus holding the wrapper clamped between the piston-head and the package. During this same movement of the arm 9 the cam-surface 33 will engage the pin of the piston-rod or plunger then lying horizontally in line with the delivery-chute, (designated as an entirety by 34,) and the piston is driven out slightly beyond the periphery of the carrier, as shown in Fig. 7, so as to insure the clearance of the package from the carrier.

35 designates the table on which the wrappers are placed, and a wrapper is shown at 36, Fig. 12, upon said table. In order to insure the proper positioning of the wrappers for action thereon by the gripping devices, hereinafter described, we have provided a pivoted gage or stop-plate, which is shown in Figs. 2, 12, and 21 at 37. Said stop-plate is carried by an arm 38, pivoted on the stationary side frame of the machine, and has a rod 39 connected thereto, which rod is reciprocated by means of a lever 40, Fig. 9, the latter being vibrated by a cam 41 on the main cam-shaft 42. The cam 41 is so timed that the stop-plate or gage 37 will be in raised position to intercept and position the wrapper as it is pushed into place by hand or otherwise and will remain in that position until the wrapper is gripped upon the surface of the carrier and the latter begins its movement, when the rotation will permit the upward movement of the rod 39 and the depression of the stop-plate to the position shown in Fig. 2, so that the wrapper will pass.

43 designates the movable gripping-jaws which grip the wrappers upon the surfaces of the carrier. These gripping-jaws have a slot-and-pin connection with the carrier, so that they reciprocate endwise, and they are moved by the arm 44 and a bell-crank pivoted at 45 on the side of the carrier and having a notched hub 46, which is engaged by a locking-latch 47, also pivoted upon the carrier and normally held in locking engagement by a leaf-spring 48, while another leaf-spring 49 affords the gripping tension upon the wrapper. A rod 50, carried by the pawl 10, is adapted to engage the depending end of the locking-latch 47 as the pawl is moved backward to engage a new tooth for advancing the carrier a step, thus permitting the gripper through its spring 49 to seize the forward edge of the wrapper, and the subsequent movements are so timed that the wrapper is released from the gripper just as it is clamped between the package and the piston 23. This release of the wrapper from the gripper is effected by the engagement of a projection 51 of the bell-crank with a cam-plate 52, which is carried upon the pawl 10, as shown in Fig. 5.

In order to prevent the carrier through momentum from running away from the actuating-pawl 10 during the period of its advancement, the ratchet ring or plate 12 is provided with interior locking-shoulders 53, and the arm 9 carries a pivoted holdback-latch 54, which is so weighted as to cause it to engage said locking-shoulders 53 when the pawl engages the locking-shoulders 11 on the outer surface of the ratchet. The latch 54 will prevent the carrier from running ahead of its actuating-pawl during its advancing movement, and at the end of this movement it is thrown out by the engagement of its forward end or nose with a lug 55, secured on the side frame of the machine.

Means for applying a line of paste to the wrapper near one edge are shown in Figs. 1, 2, and 12 and comprise paste-rolls 56 57, which are geared together, and a pivoted frame 58, carrying a paste-roll 59, also provided with a gear and controlled by a reciprocating rod or pitman 60. The purpose of gearing the rolls together is to effect their positive rotation, and motion is imparted thereto from the main shaft 18 by a belt 61. (Shown in Fig. 2.) It is sometimes desirable to throw the pasting mechanism out of action while the carrier is being turned, and in order to effect this we have shown the pitman 60 as a separable pitman. To this end it may be constructed as shown in Fig. 13, wherein at its upper end said pitman 60 has a sleeve 62, in which a rod 63 is telescoped, said rod being connected to the paste-roll frame 58 and carrying a latch 64, which engages a flange 65 on the upper end of the sleeve 62. The latch is spring-controlled, and when it is thrown out the pitman 60 plays up and down without swinging the paste-roll frame. The lower end of the pitman 60 is connected by a slotted plate 66, Fig. 14, with a pin 67 on a crank-arm 68 on the rock-shaft 3. The slot permits the pitman to drop, so that its flange will not be engaged by the latch during the reciprocation of the pitman after the latch has been once thrown out.

The operation of the mechanism so far described is as follows: The wrapper being fed forward against the gage and in position to be gripped by the grippers, the arm 9 is rocked to carry its dog into contact with a new tooth of the ring 12, so as to advance the carrier one step. During this movement of the arm the rod 50 trips the latch 47, and the spring 49 throws the grippers down to clamp the wrapper to the carrier. During the forward movement of the carrier the wrapper is drawn over the receptacle, above which it occupies a central position lengthwise; but the major portion of the wrapper is carried past the center of the receptacle. At the conclusion of the forward movement of the carrier, the wrapper being in position, the plunger delivers a package upon the top of the wrapper as another backward movement of the carrier-operating arm begins, which results in releasing the wrapper from the grippers through the engagement of the parts 51 52 and withdrawing the plunger on which the package is then resting. The wrapper is then carried into the receptacle tightly clamped between the piston and the package. When the package is fully seated within the receptacle, the longitudinal front and rear edges of the wrapper will stand in a vertical plane, while the ends of the wrapper will project beyond the open ends of the receptacle.

The first fold of the wrapper is made by a pivoted wiper 69, (shown in Fig. 12,) and to facilitate the action of this wiper we have shown means for preliminarily breaking in or bending over the upstanding rear edge of the wrapper. These means consist of a pivoted finger 70, sustained by a spring 71 and guided under a projecting lug 72 and moved by the heel of the paste-roller frame 58, to which it is pivoted, the finger being thrust forward, so as to engage the upstanding wrapper edge about mid-length and bend it forward over the package preliminary to its being engaged by the folding-blade 69. This blade is caused to wipe the rear fold over the top of the package and to return to its normal position just in advance of the folding of the front or forward flap of the wrapper down over the top of the package, which latter operation is accomplished by the wiping-brushes 73 74. The brush 73 is preferably hinged to a fixed support on the plunger-frame, and the brush 74 is hinged to the back of the brush 73 and is of finer fiber. The coarser brush 73 is intended to break down the fold of the paper and cause it to become set to the package and by its weight to spread the paste, while the fine brush exerts a smoothing or wiping action, preventing any wrinkling of the wrapper. We find these brushes to be more efficient than rollers or pads and have found that two brushes of different degrees of fineness are much more efficient than a single brush.

The mechanism above described forms the top folds. The end folds are made by folding mechanisms which are in the main like those described in our patent before referred to. These folding mechanisms are particularly shown in Figs. 15 to 19, inclusive. The folding-blades for folding the top and the side end flaps are movable and are mounted on slide-blocks 76, which are fitted to slide on the radially-arranged cheek-pieces 77, which are secured to the side frames 1 2. These blocks are vertically grooved and are made to substantially embrace the cheek-pieces 77, so as to have a firm bearing thereon. Said blocks 76 are connected through the arms 78 and cross-bar 79, and to the latter is connected one end of a walking-beam 80, which is fulcrumed on the rock-shaft 81 and whose opposite end is pivotally connected to a lever 82, driven by the cam 83, Fig. 1. As the blocks or slides 76 reciprocate they carry devices for breaking down the top end folds, such devices consisting of a breaking-down wire 84 and the end-folding blade 85, the wire operating slightly in advance of the blade. The form of the blade in outline is clearly shown in Fig. 16 and the connection to the block or slide in Fig. 17. The folding-blades for the lateral or side end flaps are marked 86 87, and they are pivoted on the blocks or slides 76 and are frictionally retarded in their pivotal action by the side clamping-springs 88 and adjusting-nuts 89, which are applied to their pivot-bolts and are swung on their pivots by means of their operating-rods 90 91, which are connected to these blades eccentrically to their pivots and which slide through the top plate 92 and have limiting-stops 93 94. The rod 91, controlling the folding-blade 87, has a spring 95 interposed between its stop 93 and the top plate 92. As the slides descend and after the folding-blade 85 has defined the top end fold the further downward movement of the rods 90 91 will be arrested and the blades 86 87 will be swung inwardly on their pivots, defining the side end folds and leaving only the bottom end fold to be formed. The stops are so set and the tension of the spring so adjusted that one of the folding-blades operates slightly in advance of the other, and thereby the flaps are folded in succession instead of simultaneously.

In order to hold the package within the receptacle while the end folds are being formed, there are employed slotted plates 96, Figs. 15 and 17, which bestride the offset lugs of the slides 76 and have the feet 97 to rest upon the top of the package. To the upper ends of these plates are pivoted latches 98, which are normally caused by the springs 99 to engage beneath the top plate 92 when the sliding plate 96 is in its lowermost position, thus locking the plates and holding the package firmly during the operation of forming the end folds. These latches are thrown out of locking engagement by the slides coming in contact with their lower shouldered ends 100, and the plates themselves are lifted by the slides as they reach the limit of upward movement, so that the package is freed therefrom. The mechanism just previously described effects the folding of the end flaps with the exception of the bottom flap, and in order to hold the bottom flaps in proper position and guide them beneath the folding devices we employ the rocking plates 101, which are best shown in Fig. 19. These plates are mounted on the rock-shafts 102, and the said shafts are provided with gear-segments 103 and are rocked by the pivoted rack-segments 104, which in turn are vibrated through the rods 105, which latter are connected to pivoted levers 106, Fig. 10, and the latter extend into the path of the cam 107 on the cam-shaft 42.

After the side folds have been formed in the end portions of the wrapper the plates 101 are moved by their gearing so as to hold the bottom flap of the wrapper bent in and to prevent the unfolding of the end flaps. The forward edges of the plates are slightly outwardly turned, as shown at 101ª. As the carrier moves forward the bottom flaps thus bent upwardly are carried underneath the curved shoes or blocks 108, which are extended well forward toward the package and to whose inner surfaces the side walls of the carrier are tangent. The lower edges of the shoes are also slightly divergent from the supporting-surfaces 109, over which the ends of the wrappers move. The forward motion of the carrier and the result of the action of these shoes is to fold up the bottom end flap against the end of the package, and the extension 110 of the shoe sets the end flaps tightly in the overlapped position. (Shown in Fig. 23.) While the package is passing this final wrapper-folding mechanism, the top folds are subjected to the action of a rotary brush 111, (shown in Figs. 1 and 2,) which brush may be driven by the belt 112 from the main driving-shaft. This rotary brush firmly sets the top folds of the package and enables the latter to be carried with the top folds downward without their becoming unsealed, and it also takes out any creases or wrinkles that might be produced therein in the operation of folding the end flaps.

We have provided a positive lock for preventing the overrunning of the carrier after an interval of movement, which is shown in application in Fig. 2 and partly in detail in Figs. 8 and 10. Said locking mechanism comprises a pivoted latch 156, engaging the locking-shoulders 157 on the edge of the carrier at the conclusion of each forward movement of the latter. This latch is thrown into engagement by toggle-arms 158, which are pivoted to the vertical rod 159, which is connected to one of the levers 106, operated by the cam 107, Fig. 10. As the carrier is about to come to rest the rod 159 is lifted and the latch is thrown into position to engage the locking-shoulder on the carrier and form a positive stop therefor, the latch being automatically withdrawn in time to permit the next forward movement. We also provide a friction-brake which acts to retard the advancing movement of the carrier, causing it to run steady and to come to rest without shock. The brake mechanism, which is shown in detail in Fig. 22, comprises oppositely-disposed cams 160 161, which engage antifriction-rollers 162 in the ends of pivoted levers 163, connected to brake-arms 164, which are pivotally connected to the side frames and carry at their upper ends the pivoted friction-shoes or rubbing-plates 165, Fig. 1. Springs 166 normally tend to hold the antifriction-rollers 162 in contact with the surface of the cams, and a set-screw 167 enables the friction to be regulated.

An off-bearing device for the wrapped packages is provided at one side of the machine, and its relation thereto and the details of construction are indicated in Figs. 1, 2, and 11. 168 represents the upper face of the delivery chute or table 34, hereinbefore referred to, which may be secured to the main frame. Delivery-belts 169 are carried over suitable turning and guiding pulleys, and said pulleys are driven from the gears 170, which are secured upon two of the pulley-shafts. Said gears are intermittently rotated by a pawl 171, which engages the teeth of a ratchet 172, secured also to the pulley-shaft below the gear, and this pawl is advanced by the vibration of an arm 173, on which the pawl is pivoted, said arm being vibrated through a link 174, a slide-bar 175, a link 176, and a bell-crank 177, which is pivotally connected, through a link 178, to the crank 68 on the oscillating shaft 3. The parts are so arranged that during the movement of the arm 9 to engage a new tooth of the carrier-ratchet the delivery-belt is moved in order to advance the row of packages resting upon the delivery-chute in contact with the belt. The feed-pawl 171 and its ratchet 172 are applied to one of the pulley-shafts, and movement is imparted to the corresponding pulley and in the same direction through the pair of intermediate gears. (Indicated by the dotted lines in Fig. 11.)

As shown in Fig. 7, the piston-plate is advanced by the cam-plate 26 beyond the periphery of the carrier, and this is for the purpose of insuring the discharge of the package completely from within the receptacle. In order to prevent the projecting piston from engaging with the end of the delivery-chute when no package is in position, a pendent arm or guide 179 is secured to the end of the chute 168 in such relation to the projecting piston that the latter will be forced back so as to clear the end of the chute.

A curved guide 181, secured to the inner face of the side frame 2, engages the rollers 25 on the piston-stems while the latter are undergoing the lower half of their rotation with the carrier about the axis of the latter, this guide serving in an obvious manner to prevent the pistons and their stems from falling out of their slides in the arms or spokes 6 of the carrier.

Such features of a label-applying mechanism as are incidentally herein shown constitute no part of the present invention, but are fully shown, described, and claimed to the extent of their novel features in a divisional application filed by us on the 11th day of October, 1902, under Serial No. 126,919.

We claim—

1. In a machine for wrapping packages, the combination with a feed-table and a rotary carrier and grippers for clamping the wrappers to the periphery of the carrier, of a pivoted gage or stop for positioning the wrappers located below the plane of said feed-table, and means for automatically raising the gage across the path of the wrapper and subsequently withdrawing it after the wrapper is gripped, substantially as described.

2. In a machine for wrapping packages, the combination with a rotatable carrier having peripheral package-receptacles, of reciprocating pistons forming the bottom wall of said receptacles, means for projecting said pistons into the plane of the opening of the receptacle where they receive the wrapper and package, and for returning them to cause the wrapper to be folded around the sides of the package, and means located at another point in the circuit of the carrier for projecting the pistons slightly beyond the plane of the opening of the receptacles, whereby to eject the package, substantially as described.

3. In a wrapping-machine, the combination with a rotating carrier having peripheral package-receptacles, of an oscillating shaft and connections for intermittently rotating the carrier, a cam-plate secured to oscillate with the shaft, pistons forming the bottom walls of the receptacles and having sliding rods or stems projected into the path of the cam-plate, and the latter having cam-surfaces adapted to project each piston into the plane of the opening of the receptacle to receive the wrapper and package and permit it to withdraw into the receptacle and to again project the piston to eject the package, substantially as described.

4. In a wrapping-machine, the combination with a rotating carrier having package-receptacles, of an oscillating shaft on which the carrier is mounted, oscillating connections including a pawl between the carrier and the shaft, whereby the carrier is driven forward intermittently, and a mechanism for preventing a momentum movement of the carrier in advance of its actuating-pawl, said means comprising a pivoted holdback-latch adapted to engage the carrier simultaneously with the engagement of the actuating-pawl, and means for disengaging the latch as the carrier comes to rest, substantially as described.

5. In a wrapping-machine, the combination with a rotating carrier and means for folding a wrapper about the package, of means for applying paste to the wrapper, said means including a roller journaled in an oscillating frame or support, a reciprocating pitman connected to said support, said pitman being composed of sections adapted for engagement and disengagement at the will of the operator, whereby the paste mechanism may be thrown out of action when desired, substantially as described.

6. In a wrapping-machine, the combination, with a rotating carrier having peripheral receptacles for the packages and intermediate supports for the margins of the wrappers, of means for pasting one edge of the wrapper, and means for folding the pasted margins of the wrapper upon the side of the package, said means comprising a plurality of brushes or brush-sections of different degrees of fineness, substantially as described.

7. In a machine for wrapping packages, the combination with a rotating carrier having peripheral receptacles and means for folding a wrapper around the sides of said packages, of end-folding mechanism comprising stationary guides, sliding blocks embracing said guides, a reciprocable breakdown-wire and folding-blade connected to each block for folding the top end flap, pivoted folders on said blocks for forming the side end folds and means for reciprocating said blocks on their slides and for oscillating said pivoted folders in due order and relation, substantially as described.

8. In a wrapping-machine, the combination, with a rotating package-carrier having peripheral package-receptacles, means for folding the wrapper around the package and tucking in the ends of said wrapper, and a pivoted plate for holding the bottom flap, of rock-shafts on which said plates are mounted, gear-segments mounted upon said rock-shaft, and vibrating rack-segments for actuating said gearing, substantially as described.

9. In an end-folding mechanism for wrapping packages, the combination with reciprocating slides carrying folding-blades, of a package-holding mechanism comprising endwise-movable slotted plates having holding feet and latches for said plates, said holding-plates and their latches being adapted to be actuated by the slides carrying the folding-blades, substantially as described.

10. In a machine for wrapping packages, the combination with means for folding the wrapper around the package, of means for setting the top fold, said means consisting of a rotary brush adapted to act upon the top surface of the package over the folds of the wrappers to set the same and to remove creases or wrinkles from the wrapper itself, substantially as described.

11. In a wrapping-machine, the combination with a rotating carrier for the packages having stop projections thereon, of a positive lock therefor comprising a reciprocating rod, a latch pivotally connected thereto, and means for moving said rod to engage the latch with said stop projections, said means comprising a cam-shaft having a cam-disk thereon engaging the rod and adapted to cause the engagement of the latch at the conclusion of the carrier movement, substantially as described.

12. In a wrapping-machine, means for delivering the wrapped packages from the machine, said means comprising a delivery chute or table and belts arranged along the side margins of said table and adapted to frictionally advance the packages, a driving-pulley for said belts and ratchet-gearing for driving said pulley intermittently, substantially as described.

13. In a wrapping-machine, means for delivering the wrapped packages from the machine, said means comprising a horizontal delivery chute or table, a pair of endless belts arranged in vertical planes along the side margins of said table and adapted to frictionally advance the packages, a driving-pulley for each of said belts, ratchet-gearing for driving one of said pulleys intermittently, and gear connections between said pulleys, substantially as described.

FRANK M. PETERS.
HENRY H. HUNGERFORD.

Witnesses:
SAMUEL N. POND,
LOUIS T. MANN.